United States Patent
Tu et al.

(10) Patent No.: US 12,530,118 B2
(45) Date of Patent: Jan. 20, 2026

(54) DATA PROCESSING METHOD AND RELATED DEVICE

(71) Applicant: Huawei Technologies Co., Ltd., Shenzhen (CN)

(72) Inventors: Jianhong Tu, Shenzhen (CN); Ruliang Dong, Hangzhou (CN); Jinyi Zhang, Hangzhou (CN); Pei Wu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 18/614,046

(22) Filed: Mar. 22, 2024

(65) Prior Publication Data

US 2024/0231626 A1    Jul. 11, 2024

Related U.S. Application Data

(63) Continuation of application No. PCT/CN2022/095948, filed on May 30, 2022.

(30) Foreign Application Priority Data

Sep. 23, 2021  (CN) .......................... 202111116330.3

(51) Int. Cl.
  *G06F 3/06*  (2006.01)
(52) U.S. Cl.
  CPC ............ *G06F 3/061* (2013.01); *G06F 3/0655* (2013.01); *G06F 3/0676* (2013.01)
(58) Field of Classification Search
  CPC ...... G06F 3/061; G06F 3/0655; G06F 3/0676; G06F 3/0659; G06F 11/20; G06F 3/0631; G06F 3/0656; G06F 3/067; G06F 12/02
  See application file for complete search history.

(56) References Cited

U.S. PATENT DOCUMENTS

| | | | |
|---|---|---|---|
| 10,552,058 B1* | 2/2020 | Jadon | G06F 3/0656 |
| 10,963,189 B1 | 3/2021 | Neelakantam et al. | |
| 2007/0198750 A1* | 8/2007 | Moilanen | G06F 9/5083 |
| | | | 710/6 |
| 2016/0154590 A1* | 6/2016 | Fan | G06F 3/0656 |
| | | | 711/118 |

FOREIGN PATENT DOCUMENTS

| | | |
|---|---|---|
| CN | 104571931 A | 4/2015 |
| CN | 104636201 A | 5/2015 |
| CN | 111371848 A | 7/2020 |
| CN | 111381770 A | 7/2020 |

OTHER PUBLICATIONS

EPO search opinion, Oct. 30, 2024 (Year: 2024).*
Yuan Gao et al., "A Multimedia I/O Access Control Policy for Transparent Computing", Journal of Hunan University (Natural Sciences), vol. 40 No. 3, Mar. 2013, with English abstract total 6 pages.

* cited by examiner

*Primary Examiner* — Jason W Blust
(74) *Attorney, Agent, or Firm* — Slater Matsil, LLP

(57) ABSTRACT

A data processing method is provided. The method includes: obtaining a parameter related to performance of a memory of a storage node, adjusting an aggregation policy based on the parameter, aggregating a first input output IO request in the memory into a second IO request based on an adjusted aggregation policy, and performing persistent storage on data corresponding to the second IO request.

20 Claims, 3 Drawing Sheets

DATA PROCESSING METHOD AND RELATED DEVICE

CROSS-REFERENCE TO RELATED APPLICATIONS

This application is a continuation of International Application No. PCT/CN2022/095948, filed on May 30, 2022, which claims priority to Chinese patent Application No. 202111116330.3, filed on Sep. 23, 2021. The disclosures of the aforementioned applications are hereby incorporated by reference in their entireties.

TECHNICAL FIELD

This application relates to the field of storage technologies, and in particular, to a data processing method and apparatus, a storage node, a computer-readable storage medium, and a computer program product.

BACKGROUND

With the development of the Internet, especially the development of the mobile Internet, massive data is generated. How to improve data storage efficiency and reduce data storage costs becomes a major concern in the industry. In a distributed storage system, to avoid a data loss caused by a single faulty storage node, a plurality of copies are usually stored for each piece of data, to ensure data security. However, multi-copy storage needs to consume a relatively large amount of storage space, resulting in a sharp increase in costs.

Based on this, an erasure code (EC) algorithm is further proposed in the industry. The EC algorithm refers to that M pieces of check data are added to N pieces of original data, and the N pieces of original data can be restored by using any N pieces of data in N+M pieces of data. When the N+M pieces of data are stored on different storage nodes or hard disks in a distributed manner, faults of M storage nodes or hard disks may be tolerated. In addition to ensuring the data security, the EC algorithm only needs to add the M pieces of check data for the N pieces of data, instead of storing the plurality of copies. This greatly improves an available capacity for users (also referred to as a disk rate) per unit of storage space. A larger EC ratio (a ratio of original data, that is, N/(N+M)) indicates a higher disk rate.

Although the EC algorithm has high reliability and disk rate, performance is poor when processing small random read/write operations (for example, random read/write of small blocks or random read/write of small objects). The larger the EC ratio, the higher the disk rate, and the more large random read/write operations are split into a plurality of small random read/write operations, which has a greater impact on performance of an entire storage system. Therefore, data corresponding to input/output (IO) requests may be cached first, then the IO requests are aggregated, and data corresponding to aggregated IO requests is performed persistent storage. After the data is cached, a write success notification may be returned, and the write success notification does not need to be returned after the persistent storage is completed, thereby reducing a delay.

In a related technology, an aggregation policy with a fixed parameter is usually used to aggregate the IO requests. For example, a plurality of small IO requests are aggregated by using a fixed aggregation waiting time (which is specifically a longest time for waiting for aggregation of the IO requests in a memory, and the aggregation is abandoned when the time expires). However, performance of the memory of the storage node in the distributed storage system may be affected by at least one factor. For example, when a service changes from a trough period to a peak period, input bandwidth of the memory (bandwidth for writing received IO requests to the memory) is greater than output bandwidth of the memory (bandwidth for performing persistent storage on IO requests in the memory). In this case, the aggregation policy with the fixed parameter, for example, an aggregation policy in the trough period, is used to aggregate the IO requests in the memory, which may cause the memory to be quickly full. For another example, in the distributed storage system, at least one storage node in a plurality of storage nodes used to form a memory pool is faulty, which leads to a reduction in a capacity of the memory pool. If the aggregation policy with the fixed parameter, for example, an aggregation policy before a fault occurs, is used to aggregate a plurality of small IO requests, the memory pool may be easily full. Therefore, overall performance of the distributed storage system is affected.

SUMMARY

This application provides a data processing method. In the method, an aggregation policy is adaptively adjusted, and small IO requests are aggregated into a large IO request based on an adjusted aggregation policy, so as to avoid impact of the small IO requests on performance of an entire distributed storage system, and avoid impact on overall performance of the distributed storage system because a memory is quickly full due to aggregation based on an aggregation policy with a fixed parameter. This application further provides an apparatus, a device, a computer-readable storage medium, and a computer program product corresponding to the foregoing method.

According to a first aspect, this application provides a data processing method, and the method may be performed by a storage node. Specifically, the storage node obtains a parameter related to performance of a memory of the storage node, adaptively adjusts an aggregation policy based on the parameter related to the performance of the memory of the storage node, aggregates a plurality of small IO requests (which may be referred to as first IO requests) in the memory into a large IO request (which may be referred to as a second IO request) based on an adjusted policy, and performs persistent storage on data corresponding to the large IO request.

On one hand, the storage node aggregates small IO requests into a large IO requests, so as to avoid impact of small IO requests on performance of an entire distributed storage system. On the other hand, an aggregation policy is adaptively adjusted, for example, one or more of the following aggregation parameters is adjusted: an aggregation waiting time, an aggregation threshold (configured to compare with a data volume of data corresponding to the IO requests, to determine whether the IO requests participate in aggregation), an aggregation stripe size (a maximum data volume of data corresponding to aggregated IO requests), and a quantity of concurrent aggregations (a maximum quantity of IO requests for which persistent storage is simultaneously enabled). In this way, it can be avoided that the memory is quickly full due to aggregation performed based on an aggregation policy with a fixed parameter, thereby affecting overall performance of the distributed storage system.

In some possible implementations, the parameter related to the performance of the memory of the storage node includes fault information of another storage node in a cluster to which the storage node belongs. The parameter related to the performance of the memory of the storage node may further include input bandwidth of the memory and output bandwidth of the memory. The input bandwidth is bandwidth used by the storage node to write received IO requests into the memory, and the output bandwidth is bandwidth used when the storage node performs persistent storage on the IO requests in the memory. In some embodiments, the parameter related to the performance of the memory of the storage node may include not only the fault information, but also the input bandwidth of the memory and the output bandwidth of the memory.

By sensing the fault information of the another storage node and/or the input bandwidth and the output bandwidth of the memory, the storage node may adaptively adjust an aggregation policy based on the foregoing information, to ensure performance of the memory of the storage node and ensure overall performance of the distributed storage system.

In some possible implementations, the aggregation policy includes one or more of an aggregation threshold, an aggregation waiting time, an aggregation stripe size, and a quantity of concurrent aggregations. The storage node may perform different adjustment manners based on different obtained parameters related to performance of the storage node.

When the input bandwidth is greater than the output bandwidth, the storage node may reduce the aggregation threshold. In this way, more IO requests may be written through, so as to prevent the memory from being quickly full. "Written through" refers to that the requests are directly written to a storage pool without being aggregated. To balance the input bandwidth and the output bandwidth and reduce memory pressure, the storage node may further increase the quantity of concurrent aggregations, so as to accelerate an aggregation progress, so that data in the memory can be quickly aggregated and stored in the storage pool.

When the input bandwidth is less than the output bandwidth, the storage node may lengthen the aggregation waiting time, increase the aggregation stripe size, and/or reduce the quantity of concurrent aggregations. In this way, more repeated data may be combined, and aggregation efficiency is improved. The repeated data refers to data with a same address or a same range.

When fault information of another storage node in a cluster to which the storage node belongs is obtained, the storage node may increase the quantity of concurrent aggregations, shorten the aggregation waiting time, reduce the aggregation stripe size, and/or increase the aggregation threshold. Increasing the quantity of concurrent aggregations may improve a capability of writing data into the storage pool from the memory; shortening the aggregation waiting time and reducing the aggregation stripe size may write data into the storage pool in a timely manner; and reducing the aggregation threshold may increase a probability that IO requests written into the memory is directly written into the storage pool without aggregation.

In some possible implementations, the storage node may further obtain access characteristics of the received IO requests, and classify the IO requests based on the access characteristics. Correspondingly, the storage node aggregates first IO requests of each category into a second IO request.

In the method, a classification mechanism is introduced in an aggregation mechanism, IO requests are classified based on access characteristics, and then IO requests of different categories are respectively aggregated, so that impact of garbage collection caused by aggregation on system performance may be significantly reduced.

In some possible implementations, the access characteristics include a quantity of access times of data that is requested to be accessed in a statistical period, and/or a latest access time of data. The quantity of access times and/or the latest access time may represent data popularity. The storage node may classify the IO requests into a plurality categories based on the quantity of access times of the data in the statistical period and/or the latest access time of the data.

A quantity of access times of data corresponding to first-category IO requests in the plurality of categories is greater than a quantity of access times of data corresponding to second-category IO requests in the plurality of categories, or a latest access time of data corresponding to first-category IO requests in the plurality of categories is later than a latest access time of data corresponding to second-category IO requests in the plurality of categories.

In this way, IO requests may be classified based on popularity. Data with a same life cycle (hot and cold) may be aggregated to significantly reduce impact of garbage collection caused by aggregation on system performance.

In some possible implementations, hot data is accessed more frequently than cold data, and correspondingly, a probability that the hot data is modified is higher than that of the cold data. Based on this, the storage node may further adjust the aggregation policy with reference to the access characteristics of the received IO requests.

Specifically, the storage node may adjust the aggregation policy to: an aggregation waiting time of first-category IO requests is greater than an aggregation waiting time of second-category IO requests, and/or an aggregation stripe size of the first-category IO requests is greater than an aggregation stripe size of the second-category IO requests.

Based on the adjusted aggregation policy, data corresponding to the hot IO requests may be cached for an additional period of time. In this way, redundant data may be effectively combined, and aggregation efficiency is improved.

In some possible implementations, the storage node may perform persistent storage, by using an EC algorithm, on data corresponding to the second IO request. The storage node may split the data corresponding to the second IO request to obtain N pieces of source data, where N is a positive integer greater than 1. Then, the storage node determines M pieces of check data based on the N pieces of source data, where M is a positive integer greater than 1. Then, the storage node performs persistent storage on one piece of data in the N pieces of source data and the M pieces of check data locally, respectively forwards remaining N+M−1 pieces of data to N+M−1 target storage nodes in a cluster to which the storage node belongs to perform persistent storage. The storage node sends one piece of data to each target storage node.

In the method, forwarding paths between the storage node and the N+M−1 target storage nodes satisfy a preset condition. For example, when the storage node and the N+M−1 target storage nodes are placed in a same rack, or connected to a same router, forwarding paths between the storage node and the N+M−1 target storage nodes are greatly shortened. When the forwarding path is less than a preset length, it may be determined that the forwarding path satisfies the preset condition. The storage node performs forwarding based on the forwarding path, so that network overheads may be greatly reduced.

According to a second aspect, an embodiment of this application provides a data processing apparatus. The apparatus includes:

a parameter acquisition module, configured to obtain a parameter related to performance of a memory of a storage node;

a policy management module, configured to adjust an aggregation policy based on the parameter, where the aggregation policy is for aggregating input/output IO requests in the memory;

an aggregation module, configured to aggregate first IO requests in the memory into a second IO request based on an adjusted aggregation policy; and a storage module, configured to perform persistent storage on data corresponding to the second IO request.

In some possible implementations, the parameter related to the performance of the memory of the storage node includes fault information of another storage node in a cluster to which the storage node belongs and/or input bandwidth of the memory and output bandwidth of the memory, the input bandwidth is bandwidth used by the storage node to write received IO requests into the memory, and the output bandwidth is bandwidth used when the storage node performs persistent storage on the IO requests in the memory.

In some possible implementations, the aggregation policy includes one or more of an aggregation threshold, an aggregation waiting time, an aggregation stripe size, and a quantity of concurrent aggregations;

when the input bandwidth is greater than the output bandwidth, the policy management module is specifically configured to:

reduce the aggregation threshold, and/or increase the quantity of concurrent aggregations;

when the input bandwidth is less than the output bandwidth, the policy management module is specifically configured to:

lengthen the aggregation waiting time, increase the aggregation stripe size, and/or reduce the quantity of concurrent aggregations; and when the fault information of the another storage node in the cluster to which the storage node belongs is obtained, the policy management module is specifically configured to:

increase the quantity of concurrent aggregations, shorten the aggregation waiting time, reduce the aggregation stripe size, and/or increase the aggregation threshold.

In some possible implementations, the parameter acquisition module is further configured to:

obtain access characteristics of the received IO requests; the apparatus further includes:

a classification module, configured to classify the IO requests based on the access characteristics; and the aggregation module is specifically configured to:

aggregate first IO requests of each category into a second IO request.

In some possible implementations, the access characteristics include a quantity of access times of data that is requested to be accessed in a statistical period, and/or a latest access time of data;

the classification module is specifically configured to:

classify the IO requests into a plurality of categories based on the quantity of access times of the data in the statistical period and/or the latest access time of the data, where a quantity of access times corresponding to first-category IO requests in the plurality of categories is greater than a quantity of access times corresponding to second-category IO requests in the plurality of categories, or a latest access time corresponding to first-category IO requests in the plurality of categories is later than a latest access time corresponding to second-category IO requests in the plurality of categories.

In some possible implementations, an aggregation waiting time of first-category IO requests is greater than an aggregation waiting time of second-category IO requests, and/or an aggregation stripe size of the first-category IO requests is greater than an aggregation stripe size of the second-category IO requests.

In some possible implementations, the storage module is specifically configured to: split the data corresponding to the second IO request, to obtain N pieces of source data, where N is a positive integer greater than 1; determine M pieces of check data based on the N pieces of source data, where M is a positive integer greater than 1; and perform persistent storage on one piece of data in the N pieces of source data and the M pieces of check data locally, and respectively forwarding remaining N+M−1 pieces of data to N+M−1 target storage nodes in the cluster to which the storage node belongs to perform persistent storage, where each node sends one piece of data, and forwarding paths between the storage node and the N+M−1 target storage nodes satisfy a preset condition.

According to a third aspect, this application provides a storage node, where the storage node includes a processor and a memory. The processor and the memory communicate with each other. The processor is configured to perform computer-readable instructions stored in the memory, to enable the storage node to perform the data processing method according to any one of the first aspect or the implementations of the first aspect.

According to a fourth aspect, this application provides a computer-readable storage medium, where the computer-readable storage medium stores instructions, and the instructions instruct a storage node to perform the data processing method according to any one of the first aspect or the implementations of the first aspect.

According to a fifth aspect, this application provides a computer program product including instructions. When the computer program product runs on a storage node, the storage node is enabled to perform the data processing method according to any one of the first aspect or the implementations of the first aspect.

In this application, the implementations according to the foregoing aspects may be further combined to provide more implementations.

BRIEF DESCRIPTION OF THE DRAWINGS

To describe the technical methods in embodiments of this application more clearly, the following briefly describes the accompanying drawings used for describing the embodiments.

DETAILED DESCRIPTION OF ILLUSTRATIVE EMBODIMENTS

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more of the features.

This application may be applied to an application scenario of a distributed storage system. The distributed storage system refers to a system that stores data on a plurality of independent storage nodes. A traditional network storage system uses a centralized storage array to store all data. The performance of the storage array is not only a bottleneck of system performance, but also a focus of reliability and security, and cannot satisfy a requirement of a large-scale storage application. The distributed storage system uses a scalable system structure and uses a plurality of storage nodes to share storage loads. This improves system reliability, availability, and access efficiency, and is easy for expansion.

Figure 1:
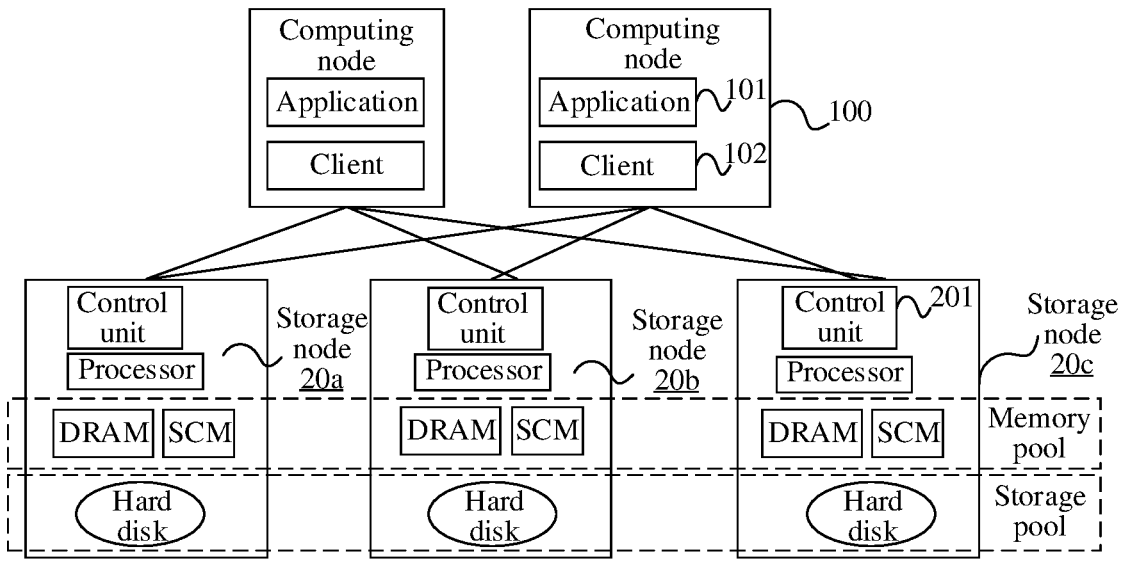
FIG. 1 is a system architectural diagram of a distributed storage system according to an embodiment of this application.

Refer to an architectural diagram of a distributed storage system shown in FIG. 1, the architecture is specifically a memory fabric (MF) architecture. As shown in FIG. 1, the distributed storage system includes a computing node cluster and a storage node cluster. The computing node cluster includes one or more computing nodes 100 (FIG. 1 shows two computing nodes 100, but is not limited to two computing nodes 100). The computing node 100 is a computing device on a user side, for example, a server or a desktop computer. At a hardware layer, a processor and a memory (not shown in FIG. 1) are disposed in the computing node 100. At a software layer, an application 101 (application for short) and a client program 102 (client for short) run on the computing node 100. The application 101 is a general term of various applications presented to a user. The client 102 is configured to receive a data access request triggered by the application 101, interact with the storage node 20, and send the data access request, also referred to as an IO request, to the storage node 20. The client 102 is further configured to receive data from the storage node, and forward the data to the application 101. It may be understood that when the client 102 is a software program, a function of the client 102 is implemented by a processor included in the computing node 100 running a program in the memory. The client 102 may also be implemented by a hardware component located inside the computing node 100. Any client 102 in the computing node cluster may access any storage node 20 in the storage node cluster.

The storage node cluster includes one or more storage nodes 20 (FIG. 1 shows three storage nodes 20, but is not limited to three storage nodes 20), and the storage nodes 20 may be interconnected. A storage node may be a server, a desktop computer, or a controller or hard disk enclosure of a storage array. In terms of functions, the storage node 20 is mainly configured to perform calculation, processing, or the like on data. In addition, the storage node cluster further includes a management node (not shown in FIG. 1). The management node is configured to create and manage a memory pool. Each storage node 20 elects a node from the storage nodes, so that the node assumes a function of a management node. The management node may communicate with any storage node 20.

In terms of hardware, as shown in FIG. 1, the storage node 20 includes at least a processor, a memory, and a control unit. The processor is a central processing unit (CPU), and is configured to process data from outside the storage node 20 or data generated inside the storage node 20. The memory is an apparatus configured to store data, and may be a memory or a hard disk. The control unit is configured to read data from the memory (for example, a hard disk) or write data into the memory based on a data read/write request. During reading and writing data, the control unit needs to convert an address carried in the data read/write request into an address that can be identified by the memory.

The memory is an internal memory that directly exchanges data with the processor. The memory may read and write data at any time, and has a fast speed. The memory is used as a temporary data storage of an operating system or another running program. The memory includes at least two categories of memories. For example, the memory may be a random access memory (RAM), or may be a read only memory (ROM). For example, the random access memory may be a dynamic random access memory (DRAM), a storage class memory (SCM), or a static random access memory (SRAM). The read only memory may be a programmable read only memory (PROM), or an erasable programmable read only memory (EPROM). The memory may also be a dual in-line memory module or a dual in-line memory module (DIMM for short), that is, a module formed by the dynamic random access memory (DRAM). In the following description, the DRAM and the SCM are used as examples for description, but it does not indicate that the storage node 20 does not include another category of memory.

Different from the memory, the hard disk is configured to store data persistently because the data read and write speed of the hard disk is slower than that of the memory. Using a storage node 20a as an example, one or more hard disks may be disposed inside the storage node 20a; or a hard disk enclosure may be mounted outside the storage node 20a, and a plurality of hard disks are disposed in the hard disk enclosure. Regardless of which deployment manner is used, these hard disks may be considered as hard disks included in the storage node 20a. The hard disk is a solid state disk, a mechanical hard disk, or another category of hard disk. Similarly, other storage nodes in the storage node cluster, such as a storage node 20b and a storage node 20c, may also include various categories of hard disks. One storage node 20 may include one or more memories of a same category.

It should be noted that the storage node 20 and the computing node 100 may also be integrated into a same physical device. Refer to another architectural diagram of the distributed storage system shown in FIG. 2, in this embodiment, the foregoing integrated device is collectively referred to as the storage node. An application is deployed inside the storage node 20. Therefore, the application may directly trigger a data write request or a data read request by using a client in the storage node 20, and the data write request or the data read request is processed by the storage node 20, or is sent to another storage node 20 for processing. In this case, the data read/write request sent by the client to a local storage node 20 specifically refers to that the client sends a data access request to the processor. In addition, a component (for example, an IO controller) included in the storage node 20 and a function of the component are similar to those of a component (for example, a control unit) included in the storage node 20 in FIG. 1, and details are not described herein again.

Figure 2:
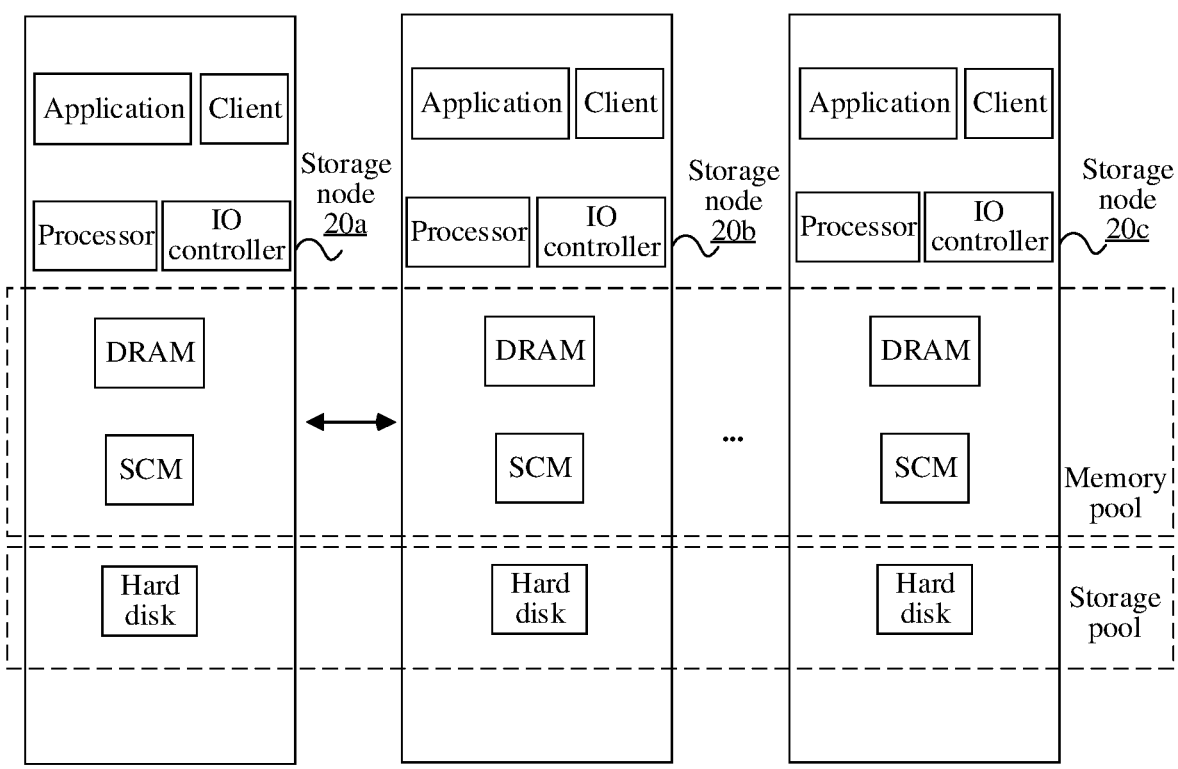
FIG. 2 is a system architectural diagram of a distributed storage system according to an embodiment of this application.

In the storage system shown in FIG. 1 or FIG. 2, the storage node 20 uses a disk-controller integration structure. The control unit 201 or the IO controller receives the IO requests, and may temporarily store data of the IO requests in the memory. When a total amount of data in the memory reaches a specific threshold, the control unit 201 or the IO controller sends the data stored in the memory to the hard disk for persistent storage. In some other possible implementations, the storage node 20 may also use a disk-controller separation structure. Specifically, the hard disk is generally placed in the hard disk enclosure, and the control unit 201 or the IO controller may communicate with the hard disk enclosure through a network, so as to store the data in the hard disk.

Each storage node 20 includes different categories of storage media, for example, includes storage media such as a DRAM, an SCM, and a hard disk. These different categories of storage media all provide memory interfaces that can be directly accessed by the processor. In addition, various categories of memories included in these storage nodes may form the memory pool. Data may be swapped in and out of different categories of storage media in the memory pool based on an access frequency.

In some embodiments, the memory pool may include only some categories of memories, for example, include only high-performance memories, such as a DRAM and an SCM, and exclude memories with relatively low performance, such as a hard disk. When the memory pool includes only a relatively high-performance storage (for example, a DRAM and an SCM) in the storage cluster, the management node may further construct a storage pool by using a relatively low-performance storage (for example, a hard disk) in the storage cluster. Similar to the memory pool, the storage pool also spans at least two storage nodes, and storage space of the storage pool includes one or more categories of hard disks in the at least two storage nodes.

When the storage cluster includes both the memory pool and the storage pool, the storage pool is configured to persistently store data, especially data that is not frequently accessed, and the memory pool is configured to temporarily store data, especially data that is frequently accessed. When the memory pool is configured to cache data, the memory pool may also be referred to as a cache pool. Specifically, when a data volume stored in the memory pool reaches a set threshold, some data in the memory pool is written into the storage pool for storage.

In application scenarios described above, with explosive data growth, a data storage requirement is increasing. It is considered that a multi-copy (for example, three-copy) storage manner needs to occupy relatively large storage space, the industry proposes an EC algorithm to replace the three-copy storage manner for data storage, so as to improve a disk rate. The EC algorithm has high reliability and high disk rate, but has poor performance in processing small random read/write operations (for example, random read/write of small blocks or random read/write of small objects). In addition, the larger the EC ratio, the more large random read/write operations are split into a plurality of small random read/write operations, which has a greater impact on performance of an entire storage system. Therefore, data corresponding to the IO requests may be cached, and then the IO requests are aggregated, and data corresponding to aggregated IO requests are performed persistent storage. On the one hand, the impact on the performance of the storage system may be reduced by aggregating the IO requests. On the other hand, a write success notification may be returned after data is cached, thereby reducing a delay.

Currently, when the IO requests are aggregated, the IO requests are generally aggregated by using an aggregation policy with a fixed parameter. For example, a fixed aggregation waiting time is used to aggregate a plurality of small IO requests. However, performance of the memory of the storage node in the distributed storage system may be affected by at least one factor. For example, when a service changes from a trough period to a peak period, input bandwidth of the memory (bandwidth for writing received IO requests to the memory) is greater than output bandwidth of the memory (bandwidth for performing persistent storage on IO requests in the memory). In this case, the aggregation policy with the fixed parameter, for example, an aggregation policy in the trough period, is used to aggregate the IO requests in the memory, which may cause the memory to be quickly full. For another example, in the distributed storage system, at least one storage node in a plurality of storage nodes used to form a memory pool is faulty, which leads to a reduction in a capacity of the memory pool. If the aggregation policy with the fixed parameter, for example, an aggregation policy before a fault occurs, is used to aggregate a plurality of small IO requests, the memory pool may be easily full. Therefore, overall performance of the distributed storage system is affected.

In view of this, an embodiment of this application provides a data processing method. The method may be performed by a storage node (for example, a storage node 20 in FIG. 1 or FIG. 2). Specifically, the storage node obtains a parameter related to performance of a memory of the storage node, adaptively adjusts an aggregation policy based on the parameter related to the performance of the memory of the storage node, aggregates a plurality of small IO requests (which may be referred to as first IO requests) in the memory into a large IO request (which may be referred to as a second IO request) based on an adjusted policy, and performs persistent storage on data corresponding to the large IO request.

On one hand, the storage node aggregates small IO requests into a large IO requests, so as to avoid impact of small IO requests on performance of an entire distributed storage system. On the other hand, an aggregation policy is adaptively adjusted, for example, one or more of the following aggregation parameters is adjusted: an aggregation waiting time, an aggregation threshold (configured to compare with a data volume of data corresponding to the IO requests, to determine whether the IO requests participate in aggregation), an aggregation stripe size (a maximum data volume of data corresponding to aggregated IO requests), and a quantity of concurrent aggregations (a maximum quantity of IO requests for which persistent storage is simultaneously enabled). In this way, it can be avoided that the memory is quickly full due to aggregation performed based on an aggregation policy with a fixed parameter, thereby affecting overall performance of the distributed storage system.

The following describes the data processing method in this embodiment of this application in detail from a perspective of the storage node 20.

Figure 3:
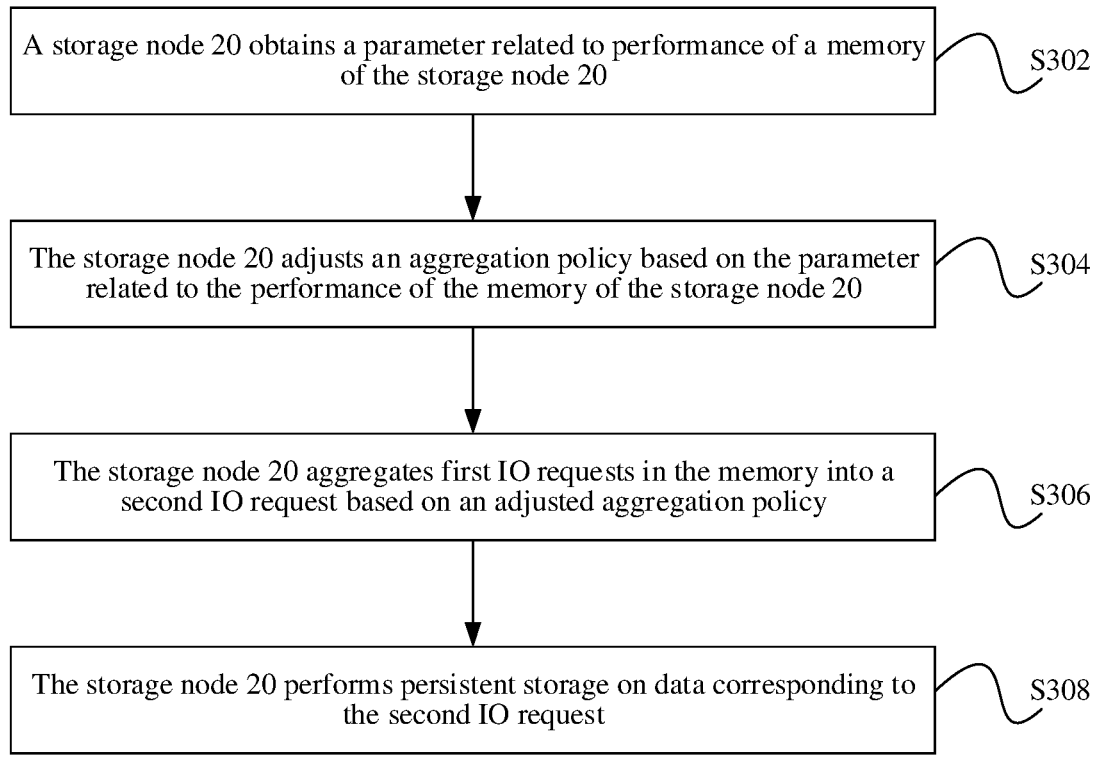
FIG. 3 is a flowchart of a data processing method according to an embodiment of this application.

Refer to a flowchart of a data processing method shown in FIG. 3, the method includes the following steps:

S302: A storage node 20 obtains a parameter related to performance of a memory of the storage node 20.

The performance of the memory is related to a memory capacity and a water level of the memory (percentage of data written to the memory). The input bandwidth of the memory and the output bandwidth of the memory may affect the water level of the memory. Based on this, the parameter related to the performance of the memory of the storage node 20 may include input bandwidth of the memory and output bandwidth of the memory.

In the distributed storage system, the memory of the storage node 20 and the memory of another storage node that belongs to a cluster may form the memory pool. If another storage node in the cluster is faulty, the capacity of the memory pool is correspondingly affected. Based on this, the parameter related to the performance of the memory of the storage node 20 may include fault information of another storage node in a cluster to which the storage node 20 belongs. The fault information may be, for example, a node identifier and a memory capacity of a faulty node.

The storage node 20 may obtain fault information of another storage node in the cluster to which the storage node 20 belongs, and/or obtain the input bandwidth of the memory and the output bandwidth of the memory. The following describes an implementation in which the storage node 20 obtains the fault information of the another storage node, and obtains the input bandwidth of the memory and the output bandwidth of the memory.

The storage node 20 may obtain the fault information of the another storage node from the management node of the cluster. Specifically, the management node of the cluster may manage a health status of the storage node that belongs to the cluster. For example, the storage node that belongs to the cluster may periodically send a heartbeat message to the management node, to notify the management node of the health state of the storage node. When the management node does not receive a heartbeat message of one or more storage nodes in N consecutive periods, the management node may determine that the storage node is faulty and record fault information, where the fault information includes, for example, a node identifier and a content capacity of a faulty storage node. Correspondingly, the storage node 20 may obtain the fault information from the management node. It should be noted that the storage node 20 may obtain the fault information from the management node based on a preset time interval. The preset time interval may be equal to a reporting period of the heartbeat message, or may be an integer multiple of a reporting period.

The storage node 20 may periodically collect statistics on information about IO requests (which may also be referred to as a foreground IO) written into the memory and information about IO requests (that is, IO requests that is performed persistent storage on the memory, which may also be referred to as a background IO) written from the memory into the storage. Information collected by the storage node 20 may be different based on different storage formats of data corresponding to the IO requests.

For example, the storage format is object storage. The IO requests written into the memory may include a key-value pair formed by an object name and object data. Correspondingly, the storage node 20 may acquire information such as an object name, a range of an access object, and a read/write delay based on the IO requests. The range of the access object may be represented by an address in the object. For example, a size of the object is 10 megabytes (megabytes, MB), and the range of the access object may be the sixth MB to the eighth MB. Based on this, the storage node 20 may obtain, based on the information about IO requests written into the memory (for example, a memory pool), for example, the range of the access object, a data volume written into the memory within a statistical period, and determine the input bandwidth of the memory based on a ratio of the data volume to the statistical period. Similarly, the storage node 20 may obtain, based on the information about IO requests written into the storage (for example, a storage pool), a data volume written into the storage within the statistical period, and determine the output bandwidth of the memory based on a ratio of the data volume to the statistical period. The statistical period may be set based on an empirical value, for example, may be set to 10 seconds (s).

It may be understood that the data processing method in this application is also applicable to block storage data. When block storage is used for data, the information about the IO requests acquired by the storage node 20 may include one or more of an access address, an access length, a read/write time, and an access delay. The storage node 20 may obtain, based on the access length of the IO requests written into the memory within the statistical period, a data volume written into the memory within the statistical period, and determine the input bandwidth of the memory based on a ratio of the data volume to the statistical period. Similarly, the storage node 20 may determine the output bandwidth of the memory in a manner similar to that of determining the input bandwidth of the memory. Details are not described herein again.

S304. The storage node 20 adjusts an aggregation policy based on the parameter related to the performance of the memory of the storage node 20.

The aggregation policy is for aggregating IO requests in the memory. The aggregation policy may include one or more of aggregation parameters such as an aggregation waiting time, an aggregation threshold, an aggregation stripe size, and a quantity of concurrent aggregations. The following describes in detail an adjustment manner of the aggregation policy in a case of different parameters.

In a first possible implementation, the input bandwidth is greater than the output bandwidth, and the storage node 20 may reduce the aggregation threshold. In this way, more IO requests can be written through, so as to prevent the memory from being quickly full. "Written through" refers to that the requests are directly written to a storage pool without being aggregated. To balance the input bandwidth and the output bandwidth and reduce memory pressure, the storage node 20 may further increase the quantity of concurrent aggregations, so as to accelerate an aggregation progress, so that data in the memory can be quickly aggregated and stored in the storage pool. It should be noted that, the foregoing adjustment operation performed by the storage node 20 may start to be performed when the water level of the memory reaches a preset water level.

In a second possible implementation, the input bandwidth is less than the output bandwidth, and the storage node 20 may lengthen the aggregation waiting time, increase the aggregation stripe size, and/or reduce the quantity of concurrent aggregations. In this way, more repeated data may be combined, and aggregation efficiency is improved. The repeated data refers to data with a same address or a same range. For ease of understanding, embodiments of this application are described with reference to a specific example. It is assumed that the aggregation waiting time before the adjustment is 1 s, and the aggregation waiting time after the adjustment is 2 s. When the IO requests in the sixth MB to the eighth MB range of an object A whose size is 10 MB is included in a first second, and the IO requests in the sixth MB to the eighth MB range of the object is further included in a second second, data corresponding to the two IO requests is repeated data. Aggregation efficiency may be improved by combining the repeated data.

In a third possible implementation, if another node in a cluster to which the storage node 20 belongs is faulty, the storage node 20 increases the quantity of concurrent aggregations, shortens the aggregation waiting time, reduces the aggregation stripe size, and/or increases the aggregation threshold. Increasing the quantity of concurrent aggregations may improve a capability of writing data into the storage pool from the memory; shortening the aggregation waiting time and reducing the aggregation stripe size may write data into the storage pool in a timely manner; and reducing the aggregation threshold may increase a probability that IO requests written into the memory is directly written into the storage pool without aggregation.

It should be noted that, when the foregoing aggregation parameter is adjusted, the storage node 20 may set a basic adjustment amplitude for each parameter, and then determine an adjustment coefficient based on at least one of a difference between the input bandwidth of the memory and the output bandwidth of the memory and a memory capacity of a faulty storage node. The storage node 20 determines an adjustment amplitude of each aggregation parameter based on the adjustment coefficient and the basic adjustment amplitude. The bandwidth difference may be positively correlated with the adjustment coefficient. A larger bandwidth difference indicates a larger adjustment coefficient and a larger adjustment amplitude of the aggregation parameter. Similarly, the memory capacity of the faulty storage node may further be positively correlated with the adjustment coefficient. A larger memory capacity of the faulty storage node indicates a larger adjustment amplitude of the aggregation parameter.

It should be further noted that, when the input bandwidth of the memory is equal to the output bandwidth of the memory, for example, after the aggregation policy is adjusted, when the input bandwidth of the memory and the output bandwidth of the memory change from unequal to equal, the storage node 20 may maintain a current aggregation policy.

S306. The storage node 20 aggregates first IO requests in the memory into a second IO request based on an adjusted aggregation policy.

Specifically, the storage node 20 may compare a data volume of data corresponding to the IO requests in the memory with the aggregation threshold. When the data volume is greater than the aggregation threshold (for example, an adjusted aggregation threshold), the data in the IO requests may be transparently written. When the data volume is less than or equal to the aggregation threshold, the IO requests may be added to an aggregation queue.

The storage node 20 may obtain a plurality of aggregation requests from the aggregation queue based on the quantity of concurrent aggregations. When a waiting time of an aggregation request that arrives at the memory earliest in the plurality of aggregation requests reaches the aggregation waiting time (for example, an adjusted aggregation waiting time), or a sum of data volumes of data corresponding to a plurality of aggregation requests reaches the aggregation stripe size (for example, an adjusted aggregation stripe size), the plurality of currently obtained aggregation requests may be aggregated, thereby aggregating the first IO requests into the second IO request. The first IO request may be an IO request in the aggregation queue, and is usually a small IO request. The second IO request may be an aggregated IO request, and is usually a large IO request.

The storage node 20 may further record metadata of data corresponding to the second IO request. For example, when object storage is used for data, the storage node 20 may record an object name and a range of an access object of the data corresponding to the second IO request, so that the data can be quickly accessed subsequently based on the metadata. In some other embodiments, when block storage is used for data, the storage node 20 may record a block identifier and a block address of the data corresponding to the second IO request.

S308. The storage node 20 performs persistent storage on data corresponding to the second IO request.

The storage node 20 may perform persistent storage, by using an EC algorithm, on the data corresponding to the second IO request. Specifically, the storage node 20 may split the data corresponding to the second IO request, to obtain N pieces of source data, where N is a positive integer greater than 1. Then, the storage node 20 may determine M pieces of check data based on the N pieces of source data, where M is a positive integer greater than 1. Next, the storage node 20 may perform persistent storage on one piece of data in the N pieces of source data and the M pieces of check data locally, and respectively forward remaining N+M−1 pieces of data to N+M−1 target storage nodes in a cluster to which the storage node belongs to perform persistent storage. The storage node 20 sends one piece of data to each target storage node in the N+M−1 target storage nodes, and the data sent to each target storage node is different. In this way, distributed data storage may be implemented.

When the distributed storage system uses a high-ratio EC algorithm to store data, the distributed storage system has more network forwarding, which leads to increased network overheads. Therefore, the storage node 20 may respectively write the remaining N+M−1 pieces of data into the N+M−1 target storage nodes in which forwarding paths between the storage node 20 and the N+M−1 target storage nodes satisfy a preset condition, to perform persistent storage. Each target storage node stores one piece of data in the remaining N+M−1 pieces of data.

The forwarding path between the storage node 20 and the target storage node may represent affinity with the storage node 20. A shorter forwarding path indicates higher affinity. Based on this, the storage node 20 may further respectively forward the remaining N+M−1 pieces of data to the N+M−1 target storage nodes that satisfy an affinity requirement between the storage node 20, to perform persistent storage. The N+M−1 target storage nodes in which forwarding paths satisfy the preset condition or in which affinity satisfies the affinity requirement may be N+M−1 target storage nodes that are located in a same rack as the storage node 20, or N+M−1 target storage nodes that are connected to a same router as the storage node 20. In this way, a length of the forwarding path may be reduced, thereby reducing network overheads.

The following uses an example in which the data corresponding to the second IO request is an object for description. In a specific implementation, the storage node 20 may be a primary object-based storage device OSD (device). The primary OSD may divide an aggregated large object into M source objects, and generate N check objects based on the M source objects. The primary OSD may generate an object ID for the large object through an object ID generator, and then may use the object ID as an input, and determine, with reference to a routing algorithm and a topology (also referred to as a view) of the distributed storage system, nodes to which the source object and the check object need to be forwarded, for example, OSD 1, OSD 2, . . . , OSD N+M−1. The primary OSD may calculate affinity between the primary OSD and OSD 1 to OSD N+M−1 that need to be forwarded.

When the affinity does not satisfy the requirement, for example, is less than a preset value, the primary OSD may regenerate the object ID, re-determine, by using the routing algorithm and the topology of the distributed storage system, nodes to which the source object and the check object need to be forwarded, and calculate affinity between the primary OSD and a re-determined OSD. When the affinity satisfies the requirement, the primary OSD may forward the M source objects and the N check objects to the nodes that satisfy the affinity requirement, to reduce network overheads.

In some embodiments, a maximum quantity of times of retry may further be set for the primary OSD. When the quantity of times of retry of the primary OSD reaches the foregoing maximum quantity of times of retry, but the affinity still cannot satisfy the requirement, a node with optimal affinity may be selected from a plurality of groups of nodes determined by the primary OSD for forwarding. In this way, network overheads may be reduced.

In consideration of features such as low costs and large capacities of object storage, when the data corresponding to the second IO request is performed persistent storage, the data may be stored in an object storage format. When block storage is used for the data corresponding to the second IO request, format conversion may be further performed on the data, for example, format conversion is performed according to a storage protocol of object storage, to obtain the object. In this way, the storage node 20 may perform persistent storage on the object based on the EC algorithm.

In some possible implementations, data corresponding to different IO requests may have different popularity. Based on this, the storage node 20 may further classify the IO requests based on popularity of data requested to be accessed, and respectively aggregate IO requests of different categories. IO requests of a same category have similar data popularity. Therefore, there is a high probability that garbage collection (garbage collection, GC) is performed in a same period. The garbage collection refers to that when some data in aggregated data written into the storage pool is modified or deleted, and invalid storage space occurs, remaining valid data is re-aggregated, to recycle storage space of original aggregated data. In this way, efficiency of garbage collection may be significantly improved, thereby reducing impact of garbage collection caused by aggregation on system performance.

The following describes in detail another implementation of the data processing method provided in embodiments of this application with reference to the accompanying drawings.

Figure 4:
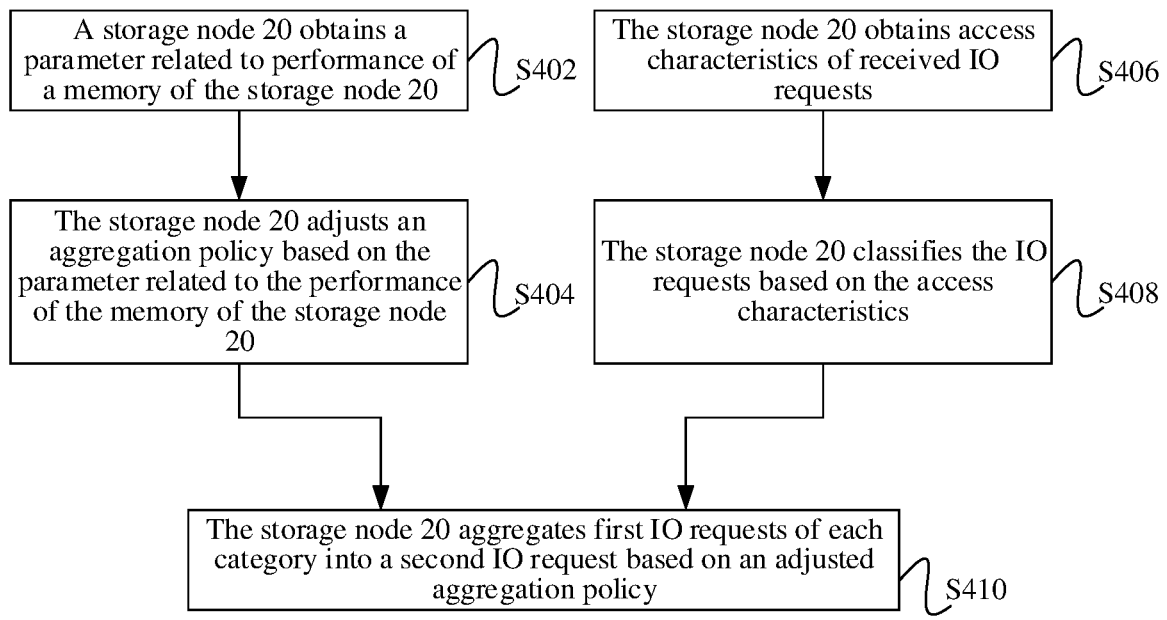
FIG. 4 is a flowchart of a data processing method according to an embodiment of this application.

Refer to a flowchart of a data processing method shown in FIG. 4, the method includes the following steps:

S402: A storage node 20 obtains a parameter related to performance of a memory of the storage node.

S404. The storage node 20 adjusts an aggregation policy based on the parameter related to the performance of the memory of the storage node.

For related implementations of S402 to S404, refer to related content descriptions in embodiments shown in FIG. 3. Details are not described herein again.

S406. The storage node 20 obtains access characteristics of received IO requests.

The access characteristics of the IO requests may include a quantity of access times of data that is requested to be accessed in a statistical period, and/or a latest access time of the data. Specifically, the storage node 20 may obtain the IO requests received in the statistical period, and determine, based on information carried in the IO requests, a quantity of access times of data that is requested to be accessed in the statistical period and/or a latest access time of the data.

For example, the data that is requested to be accessed is data in an object. The IO requests received by the storage node 20 may carry an object name and a range of an access object. The storage node 20 may collect statistics on a quantity of access times of different ranges of a same object based on the object name, or collect statistics on at least one access time of different ranges of a same object, and determine a latest access time of each range from the at least one access time of each range of the same object.

S408. The storage node 20 classifies the IO requests based on the access characteristics.

The access characteristics, for example, a quantity of access times and/or a latest access time, may represent data popularity. The data popularity may be represented by using a quantitative popularity value, or may be represented by using a qualitative popularity level. In some embodiments, the popularity level may include two levels: hot and cold, or may include three levels: hot, warm, and cold. The popularity level may be further subdivided. For example, the popularity level may include five levels: extremely hot, hot, warm, cold, and extremely cold.

For example, the data popularity is obtained based on the quantity of access times in the statistical period. The storage node 20 may obtain a quantity of access times of each piece of data in the statistical period, and input the quantity of times into a popularity function to obtain a function value, where the function value is the popularity value of the foregoing data. The storage node 20 may further determine the popularity level based on the popularity value. For example, if the popularity value of the data is less than a preset threshold, it is determined that the data is cold data. If the popularity value of the data is greater than the preset threshold, it is determined that the data is hot data.

Based on this, the storage node 20 may classify the IO requests based on the popularity of the data that is requested to be accessed. For example, the storage node 20 may classify data into two categories: cold and hot based on popularity. For another example, the storage node 20 may classify data into three categories: cold, warm, and hot based on popularity. A quantity of categories is not limited in this embodiment.

S410. The storage node 20 aggregates first IO requests of each category into a second IO request based on an adjusted aggregation policy.

The storage node 20 may maintain a corresponding aggregation queue for the IO requests of each category. Specifically, the storage node may compare a data volume of data corresponding to IO requests of each category with the aggregation threshold. When the data volume is greater than the aggregation threshold (for example, an adjusted aggregation threshold), the data in the IO requests may be transparently written. When the data volume is less than or equal to the aggregation threshold, the IO requests may be added to the aggregation queue corresponding to the category.

Then, the storage node 20 may extract IO requests from the aggregation queue corresponding to each category for aggregation, to respectively aggregate the first IO requests of each category into the second IO request. For an aggregation process, reference may be made to related content description in embodiments shown in FIG. 3, and details are not described herein again.

Further, the hot data is accessed more frequently than the cold data, and correspondingly, a probability that the hot data is modified is higher than that of the cold data. Based on this, in S404, the storage node 20 may further adjust the aggregation policy with reference to the access characteristics of the received IO requests.

Specifically, a quantity of access times of data corresponding to first-category IO requests in the plurality of categories is greater than a quantity of access times of data corresponding to second-category IO requests in the plurality of categories, or a latest access time of data corresponding to the first-category IO requests in the plurality of categories is later than a latest access time of data corresponding to the second-category IO requests in the plurality of categories, that is, popularity of the data corresponding to the first-category IO requests is higher than popularity of the second-category IO requests, the storage node 20 may set an aggregation waiting time of the first-category IO requests to be greater than an aggregation waiting time of the second-category IO requests, or set an aggregation stripe size of the first-category IO requests to be greater than an aggregation stripe size of the second-category IO requests. In some embodiments, the storage node 20 may further set an aggregation waiting time of first-category IO requests to be greater than an aggregation waiting time of second-category IO requests, and an aggregation stripe size of the first-category IO requests to be greater than an aggregation stripe size of the second-category IO requests.

For example, a plurality of categories include two categories: cold and hot. For hot IO requests, the storage node 20 may lengthen an aggregation waiting time, and increase an aggregation stripe size, so that data corresponding to the hot IO requests can be cached for an additional period of time. In this way, redundant data may be effectively combined. For extremely hot data, the storage node 20 may even cache the data for a long time without writing the data into the storage pool, so as to reduce overheads.

The foregoing describes in detail the data processing method provided in embodiments of this application with reference to FIG. 1 to FIG. 4. The following describes an apparatus and a device provided in embodiments of this application with reference to the accompanying drawings.

Figure 5:
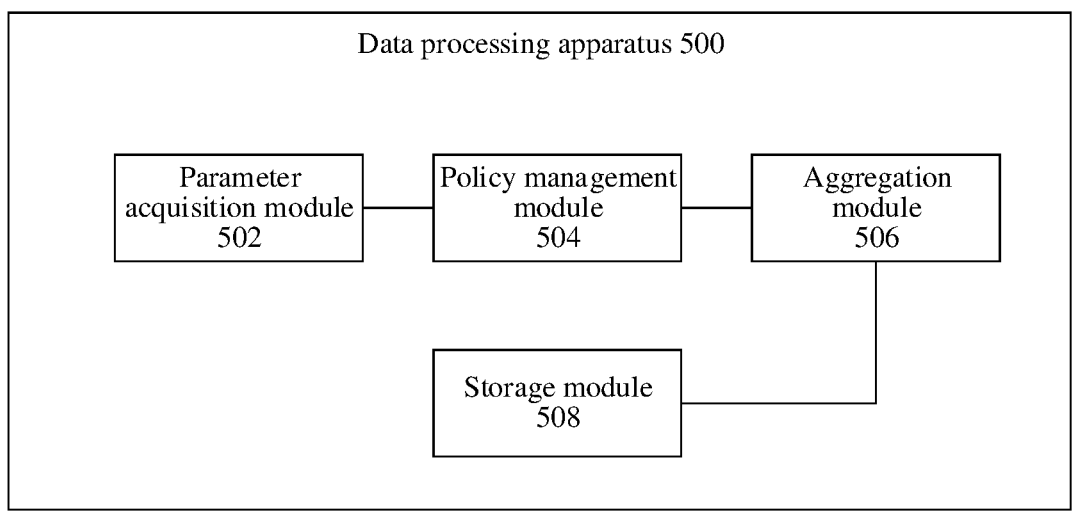
FIG. 5 is a schematic structural diagram of a data processing apparatus according to an embodiment of this application.

Refer to a schematic structural diagram of a data processing apparatus shown in FIG. 5, the apparatus 500 includes a parameter acquisition module 502, a policy management module 504, an aggregation module 506, and a storage module 508.

The parameter acquisition module 502 is configured to perform the method steps corresponding to S302 in embodiments shown in FIG. 3, the policy management module 504 is configured to perform the method steps corresponding to S304 in embodiments shown in FIG. 3, the aggregation module 506 is configured to perform the method steps corresponding to S306 in embodiments shown in FIG. 3, and the storage module 508 is configured to perform the method steps corresponding to S308 in embodiments shown in FIG. 3.

In some possible implementations, for the parameter related to the performance of the memory of the storage node, refer to related content descriptions in S302. Details are not described herein again.

In some possible implementations, the aggregation policy includes one or more of an aggregation threshold, an aggregation waiting time, an aggregation stripe size, and a quantity of concurrent aggregations. For a process of adjusting the aggregation policy by the policy management module 504, refer to related content descriptions in S304.

In some possible implementations, the apparatus 500 may further include a classification module. The parameter acquisition module 502 is further configured to perform the method steps corresponding to S406 in embodiments shown in FIG. 4, and the classification module is configured to perform the method steps corresponding to S408 in embodiments shown in FIG. 4. Correspondingly, the aggregation module 506 is specifically configured to perform the method steps corresponding to S410 in embodiments shown in FIG. 4.

In some possible implementations, the access characteristics include a quantity of access times of data that is requested to be accessed in the statistical period and/or a latest access time of data, and the classification module is configured to perform the method steps corresponding to S408 in embodiments shown in FIG. 4, to classify the IO requests.

In some possible implementations, the apparatus 500 may further adjust the aggregation policy with reference to the access characteristics. For example, the aggregation policy may be adjusted as follows: an aggregation waiting time of first-category IO requests is greater than an aggregation waiting time of second-category IO requests, and/or an aggregation stripe size of the first-category IO requests is greater than an aggregation stripe size of the second-category IO requests.

In some possible implementations, the storage module 508 is configured to perform the method steps corresponding to S308 in embodiments shown in FIG. 3, to reduce network overheads generated when persistent storage is performed by using the high-ratio EC algorithm.

The data processing apparatus 500 according to embodiments of this application may correspondingly perform the methods described in embodiments of this application, and the foregoing and other operations and/or functions of the modules/units of the data processing apparatus 500 are respectively used to implement corresponding procedures of the methods in embodiments shown in FIG. 3 and FIG. 4. For brevity, details are not described herein again.

An embodiment of this application further provides a storage node 20. The storage node 20 may be a terminal device such as a notebook computer or a desktop computer, or may be a server in a cloud environment or an edge environment. The storage node 20 is specifically configured to implement a function of the data processing apparatus 500 in embodiments shown in FIG. 5.

For a hardware structure of the storage node 20 provided in embodiments of this application, refer to FIG. 1 or FIG. 2. As shown in FIG. 1 or FIG. 2, the storage node 20 may include a processor and a memory. The memory stores computer-readable instructions, and the processor performs the computer-readable instructions, so that the storage node 20 performs the data processing method in the foregoing embodiment (or implements a function of the data processing apparatus 500).

Specifically, in a case in which embodiments of the apparatus shown in FIG. 5 is implemented, and functions of the modules of the data processing apparatus 500 described in FIG. 5 such as the parameter acquisition module 502, the policy management module 504, the aggregation module 506, and the storage module 508 are implemented by using software, software or program code required for performing the functions of the modules in FIG. 5 may be stored in a memory. The processor performs the program code stored in the memory, so that the storage node 20 performs the foregoing data processing method.

An embodiment of this application further provides a computer-readable storage medium. The computer-readable storage medium may be any usable medium that can be stored by a computing device, or a data storage device, for example, a data center, including one or more usable media. The usable medium may be a magnetic medium (for example, a floppy disk, a hard disk, or a magnetic tape), an optical medium (for example, a DVD), a semiconductor medium (for example, a solid-state drive), or the like. The computer-readable storage medium includes instructions, and the instructions instruct a computing device or a computing device cluster to perform the foregoing data processing method.

An embodiment of this application further provides a computer program product. The computer program product includes one or more computer instructions. When the computer instructions are loaded and executed on the computing device, the procedures or functions based on embodiments of this application are all or partially generated. The computer instructions may be stored in a computer-readable storage medium, or may be transmitted from one computer-readable storage medium to another computer-readable storage medium. For example, the computer instructions may be transmitted from a website, a computing device, or a data center to another website, computing device, or data center in a wired (for example, a coaxial cable, an optical fiber, or a digital subscriber line (DSL)) or wireless (for example, infrared, radio, or microwave) manner. The computer program product may be a software installation package. When any one of the foregoing data processing methods needs to be used, the computer program product may be downloaded and executed on a computing device or a computing device cluster.

Descriptions of procedures or structures corresponding to the foregoing accompanying drawings have respective focuses. For a part that is not described in detail in a procedure or structure, refer to related descriptions of other procedures or structures.

What is claimed is:

1. A method, applied to a storage node, the method comprising:
    obtaining a parameter related to performance of a memory of the storage node;
    adjusting an aggregation policy based on the parameter, to obtain an adjusted aggregation policy, wherein the aggregation policy is configured for aggregating input/output (IO) requests in the memory;
    aggregating first IO requests in the memory into a second IO request based on the adjusted aggregation policy; and
    performing persistent storage on data corresponding to the second IO request;
    wherein the parameter related to the performance of the memory of the storage node comprises fault information of another storage node in a cluster to which the storage node belongs, and wherein the aggregation policy comprises one or more of an aggregation threshold, an aggregation waiting time, an aggregation stripe size, and a quantity of concurrent aggregations; and
    wherein when the fault information of the another storage node in the cluster to which the storage node belongs is obtained, the storage node adjusts the aggregation policy by increasing the quantity of concurrent aggregations, shortening the aggregation waiting time, or reducing the size of the aggregation stripe.

2. The method according to claim 1, wherein the parameter related to the performance of the memory of the storage node further comprises:
    input bandwidth of the memory and output bandwidth of the memory, wherein the input bandwidth is used by the storage node to write received IO requests into the memory, and the output bandwidth is used when the storage node performs persistent storage on the received IO requests in the memory.

3. The method according to claim 1, further comprising:
    obtaining access characteristics of received IO requests; and
    classifying the received IO requests into one or more categories based on the access characteristics; and
    wherein aggregating the first IO requests into the second IO request based on the adjusted aggregation policy comprises:
    aggregating first IO requests of each category into a corresponding second IO request.

4. The method according to claim 3, wherein performing persistent storage on the data corresponding to the second IO request comprises:
    splitting the data corresponding to the second IO request, to obtain N pieces of source data, wherein N is a positive integer greater than 1;
    determining M pieces of check data based on the N pieces of source data, wherein M is a positive integer greater than 1; and
    performing persistent storage on one piece of data in the N pieces of source data and the M pieces of check data locally, and respectively forwarding remaining N+M−1 pieces of data to N+M−1 target storage nodes in a cluster to which the storage node belongs to perform persistent storage, wherein each target storage node receives one piece of the N+M−1 pieces of data, and forwarding paths between the storage node and the N+M−1 target storage nodes satisfy a preset condition.

5. The method according to claim 3, wherein the access characteristics comprise a quantity of access times of the data that is requested to be accessed in a statistical period or a latest access time of the data.

6. The method according to claim 1, wherein performing persistent storage on the data corresponding to the second IO request comprises:
    splitting the data corresponding to the second IO request, to obtain N pieces of source data, wherein N is a positive integer greater than 1;
    determining M pieces of check data based on the N pieces of source data, wherein M is a positive integer greater than 1; and
    performing persistent storage on one piece of data in the N pieces of source data and the M pieces of check data locally, and respectively forwarding remaining N+M−1 pieces of data to N+M−1 target storage nodes in a cluster to which the storage node belongs to perform persistent storage, wherein each target storage node receives one piece of the N+M−1 pieces of data, and forwarding paths between the storage node and the N+M−1 target storage nodes satisfy a preset condition.

7. The method according to claim 1, wherein when the fault information of the another storage node in the cluster to which the storage node belongs is obtained, the storage node adjusts the aggregation policy by increasing the quantity of concurrent aggregations, shortening the aggregation waiting time, and reducing the size of the aggregation stripe.

8. A storage node, comprising:
at least one processor and at least one memory, wherein the at least one memory stores computer-readable instructions, and the computer-readable instructions are executable by the at least one processor, to enable the storage node to perform:
obtaining a parameter related to performance of a memory of the storage node;
adjusting an aggregation policy based on the parameter, to obtain an adjusted aggregation policy, wherein the aggregation policy is configured for aggregating input/output (IO) requests in the memory;
aggregating first IO requests in the memory into a second IO request based on the adjusted aggregation policy; and
performing persistent storage on data corresponding to the second IO request;
wherein the parameter related to the performance of the memory of the storage node comprises fault information of another storage node in a cluster to which the storage node belongs, and wherein the aggregation policy comprises one or more of an aggregation threshold, an aggregation waiting time, an aggregation stripe size, and a quantity of concurrent aggregations; and
wherein when the fault information of the another storage node in the cluster to which the storage node belongs is obtained, the storage node adjusts the aggregation policy by increasing the quantity of concurrent aggregations, shortening the aggregation waiting time, or reducing the size of the aggregation stripe.

9. The storage node according to claim 8, wherein the parameter related to the performance of the memory of the storage node further comprises:
input bandwidth of the memory and output bandwidth of the memory, wherein the input bandwidth is used by the storage node to write received IO requests into the memory, and the output bandwidth is used when the storage node performs persistent storage on the received IO requests in the memory.

10. The storage node according to claim 8, wherein the computer-readable instructions are further executable by the at least one processor, to enable the storage node to perform:
obtaining access characteristics of received IO requests; and
classifying the received IO requests into one or more categories based on the access characteristics; and
wherein aggregating the first IO requests into the second IO request based on the adjusted aggregation policy comprises:
aggregating first IO requests of each category into a corresponding second IO request.

11. The storage node according to claim 10, wherein performing persistent storage on the data corresponding to the second IO request comprises:
splitting the data corresponding to the second IO request, to obtain N pieces of source data, wherein N is a positive integer greater than 1;
determining M pieces of check data based on the N pieces of source data, wherein M is a positive integer greater than 1; and
performing persistent storage on one piece of data in the N pieces of source data and the M pieces of check data locally, and respectively forwarding remaining N+M−1 pieces of data to N+M−1 target storage nodes in a cluster to which the storage node belongs to perform persistent storage, wherein each target storage node receives one piece of data of the N+M−1 pieces of data, and forwarding paths between the storage node and the N+M−1 target storage nodes satisfy a preset condition.

12. The storage node according to claim 10, wherein the access characteristics comprise a quantity of access times of the data that is requested to be accessed in a statistical period or a latest access time of the data.

13. The storage node according to claim 8, wherein performing persistent storage on the data corresponding to the second IO request comprises:
splitting the data corresponding to the second IO request, to obtain N pieces of source data, wherein N is a positive integer greater than 1;
determining M pieces of check data based on the N pieces of source data, wherein M is a positive integer greater than 1; and
performing persistent storage on one piece of data in the N pieces of source data and the M pieces of check data locally, and respectively forwarding remaining N+M−1 pieces of data to N+M−1 target storage nodes in a cluster to which the storage node belongs to perform persistent storage, wherein each target storage node receives one piece of data of the N+M−1 pieces of data, and forwarding paths between the storage node and the N+M−1 target storage nodes satisfy a preset condition.

14. The storage node according to claim 8, wherein when the fault information of the another storage node in the cluster to which the storage node belongs is obtained, the storage node adjusts the aggregation policy by increasing the quantity of concurrent aggregations, shortening the aggregation waiting time, and reducing the size of the aggregation stripe.

15. A non-transitory computer-readable storage medium, comprising computer-readable instructions, wherein when the computer-readable instructions are run on a storage node, the storage node is enabled to perform:
obtaining a parameter related to performance of a memory of the storage node;
adjusting an aggregation policy based on the parameter, to obtain an adjusted aggregation policy, wherein the aggregation policy is configured for aggregating input/output (IO) requests in the memory;
aggregating first IO requests in the memory into a second IO request based on the adjusted aggregation policy; and
performing persistent storage on data corresponding to the second IO request;
wherein the parameter related to the performance of the memory of the storage node comprises fault information of another storage node in a cluster to which the storage node belongs, and wherein the aggregation policy comprises one or more of an aggregation threshold, an aggregation waiting time, an aggregation stripe size, and a quantity of concurrent aggregations; and
wherein when the fault information of the another storage node in the cluster to which the storage node belongs is obtained, the storage node adjusts the aggregation policy by increasing the quantity of concurrent aggregations, shortening the aggregation waiting time, or reducing the size of the aggregation stripe.

16. The non-transitory computer-readable storage medium according to claim 15, wherein the parameter related to the performance of the memory of the storage node further comprises:
input bandwidth of the memory and output bandwidth of the memory, wherein the input bandwidth is used by the storage node to write received IO requests into the memory, and the output bandwidth is used when the storage node performs persistent storage on the received IO requests in the memory.

17. The non-transitory computer-readable storage medium according to claim 15, wherein when the computer-readable instructions are run on the storage node, the storage node is further enabled to perform:
    obtaining access characteristics of received IO requests; and
    classifying the IO requests into one or more categories based on the access characteristics; and
    wherein aggregating the first IO requests into the second IO request based on the adjusted aggregation policy comprises:
        aggregating first IO requests of each category into the second IO request.

18. The non-transitory computer-readable storage medium according to claim 17, wherein performing persistent storage on the data corresponding to the second IO request comprises:
    splitting the data corresponding to the second IO request, to obtain N pieces of source data, wherein N is a positive integer greater than 1;
    determining M pieces of check data based on the N pieces of source data, wherein M is a positive integer greater than 1; and
    performing persistent storage on one piece of data in the N pieces of source data and the M pieces of check data locally, and respectively forwarding remaining N+M−1 pieces of data to N+M−1 target storage nodes in a cluster to which the storage node belongs to perform persistent storage, wherein each target storage node receives one piece of data of the N+M−1 pieces of data, and forwarding paths between the storage node and the N+M−1 target storage nodes satisfy a preset condition.

19. The non-transitory computer-readable storage medium according to claim 15, wherein performing persistent storage on the data corresponding to the second IO request comprises:
    splitting the data corresponding to the second IO request, to obtain N pieces of source data, wherein N is a positive integer greater than 1;
    determining M pieces of check data based on the N pieces of source data, wherein M is a positive integer greater than 1; and
    performing persistent storage on one piece of data in the N pieces of source data and the M pieces of check data locally, and respectively forwarding remaining N+M−1 pieces of data to N+M−1 target storage nodes in a cluster to which the storage node belongs to perform persistent storage, wherein each target storage node receives one piece of data of the N+M−1 pieces of data, and forwarding paths between the storage node and the N+M−1 target storage nodes satisfy a preset condition.

20. The non-transitory computer-readable storage medium according to claim 15, wherein when the fault information of the another storage node in the cluster to which the storage node belongs is obtained, the storage node adjusts the aggregation policy by increasing the quantity of concurrent aggregations, shortening the aggregation waiting time, and reducing the size of the aggregation stripe.

* * * * *